(12) United States Patent
Tadaie

(10) Patent No.: US 11,033,148 B2
(45) Date of Patent: Jun. 15, 2021

(54) PORTABLE DUAL FUEL COOKING ASSEMBLY

(71) Applicant: Mo Tadaie, Anaheim, CA (US)

(72) Inventor: Mo Tadaie, Anaheim, CA (US)

( * ) Notice: Subject to any disclaimer, the term of this patent is extended or adjusted under 35 U.S.C. 154(b) by 125 days.

(21) Appl. No.: 16/299,799

(22) Filed: Mar. 12, 2019

(65) Prior Publication Data

US 2020/0288911 A1 Sep. 17, 2020

(51) Int. Cl.
*A47J 37/07* (2006.01)

(52) U.S. Cl.
CPC ....... *A47J 37/0763* (2013.01); *A47J 37/0713* (2013.01)

(58) Field of Classification Search
CPC .......................... A47J 37/0763; A47J 37/0713
See application file for complete search history.

(56) References Cited

U.S. PATENT DOCUMENTS

| | | | | |
|---|---|---|---|---|
| 675,843 A * | 6/1901 | Shafer | ..................... | F24C 11/00 126/4 |
| 3,191,592 A * | 6/1965 | Lorbacher | ........... | A47J 37/0704 126/25 A |
| 3,688,757 A * | 9/1972 | Dusek | ................. | A47J 37/0763 126/9 R |
| 3,794,013 A * | 2/1974 | Upton | ................. | A47J 37/0682 126/40 |
| 4,541,406 A * | 9/1985 | DaSambiagio | ..... | A47J 37/0763 126/25 A |
| 4,628,897 A * | 12/1986 | Stanfa | ..................... | A47J 37/06 126/340 |
| 5,579,680 A | 12/1996 | Graur | | |
| 5,735,260 A * | 4/1998 | Rimback | ............. | A47J 37/0713 126/39 J |
| 6,000,389 A * | 12/1999 | Alpert | ................. | A47J 37/0713 126/25 R |
| 6,027,174 A * | 2/2000 | Gerbasi | ................. | E04G 23/006 299/14 |
| 6,041,769 A * | 3/2000 | Llodra, Jr. | .......... | A47J 37/0759 126/197 |
| 6,263,784 B1 | 7/2001 | Wodeslavsky | | |
| 6,439,111 B1 * | 8/2002 | Lu | ....................... | A47J 37/0763 126/25 R |
| D465,378 S | 11/2002 | Hermansen | | |

(Continued)

FOREIGN PATENT DOCUMENTS

WO WO2010028665 3/2010

*Primary Examiner* — Jorge A Pereiro
*Assistant Examiner* — Logan P Jones

(57) ABSTRACT

A portable, dual fuel cooking assembly includes a rack that has a plurality of wheels thereon for rolling the rack along a support surface having the rack being vertically oriented. A plurality of gaseous fuel tanks is provided each of the gaseous fuel tanks is positioned on the rack. A charcoal pan is removably positionable on the second supports and the charcoal pan is comprised of a heat resistant material for having charcoal burned thereupon for cooking. A grill slidably engages the rack has the grill is positioned above the charcoal pan for cooking. A plurality of tiles is each of the tiles is positioned on top of the rack for cooking. A burner is coupled to the rack and the burner is positioned beneath the tiles such that the burner directs a flame upwardly onto the tiles when the burner is turned on to cook the food item.

8 Claims, 5 Drawing Sheets

(56) References Cited

U.S. PATENT DOCUMENTS

| | | | | |
|---|---|---|---|---|
| 7,832,390 B2* | 11/2010 | Hsu | ............................ | F24C 1/02 |
| | | | | 126/36 |
| 8,490,614 B1* | 7/2013 | Gregory | .............. | A47J 37/0754 |
| | | | | 126/41 R |
| 9,433,322 B2 | 9/2016 | Axinte | | |
| 2006/0054157 A1 | 3/2006 | Wang | | |
| 2007/0152414 A1* | 7/2007 | Home | ........................ | B62B 3/10 |
| | | | | 280/47.35 |
| 2007/0221191 A1* | 9/2007 | O'Brien | .............. | A47J 37/0713 |
| | | | | 126/25 R |
| 2008/0190408 A1* | 8/2008 | Hsu | ............................ | F24C 3/14 |
| | | | | 126/36 |
| 2009/0050131 A1* | 2/2009 | Lee | ........................ | F25B 21/02 |
| | | | | 126/25 R |
| 2011/0219957 A1 | 9/2011 | Fogolin | | |
| 2012/0247448 A1* | 10/2012 | Thibodeaux | ......... | A47J 37/0713 |
| | | | | 126/25 R |
| 2017/0105573 A1* | 4/2017 | Atkisson | .............. | A47J 37/0786 |

* cited by examiner

PORTABLE DUAL FUEL COOKING ASSEMBLY

CROSS-REFERENCE TO RELATED APPLICATIONS

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to cooking devices and more particularly pertains to a new cooking device for simultaneously grilling and frying.

BRIEF SUMMARY OF THE INVENTION

An embodiment of the disclosure meets the needs presented above by generally comprising a rack that has a plurality of wheels thereon for rolling the rack along a support surface having the rack being vertically oriented. A plurality of gaseous fuel tanks is provided each of the gaseous fuel tanks is positioned on the rack. A charcoal pan is removably positionable on the second supports and the charcoal pan is comprised of a heat resistant material for having charcoal burned thereupon for cooking. A grill slidably engages the rack has the grill is positioned above the charcoal pan for cooking. A plurality of tiles is each of the tiles is positioned on top of the rack for cooking. A burner is coupled to the rack and the burner is positioned beneath the tiles such that the burner directs a flame upwardly onto the tiles when the burner is turned on to cook the food item.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
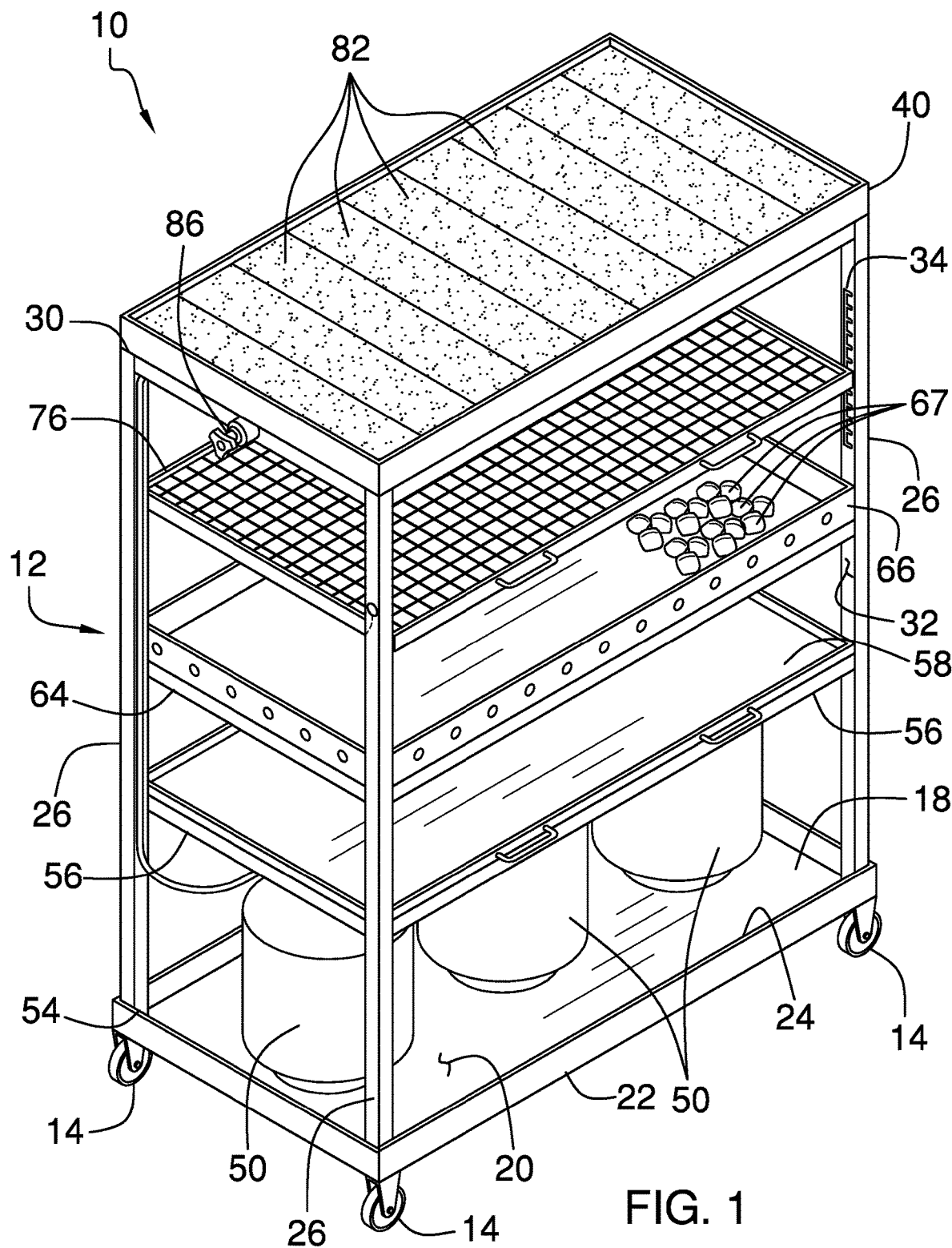
FIG. 1 is a top perspective view of a portable, dual fuel cooking assembly according to an embodiment of the disclosure.
Figure 2:
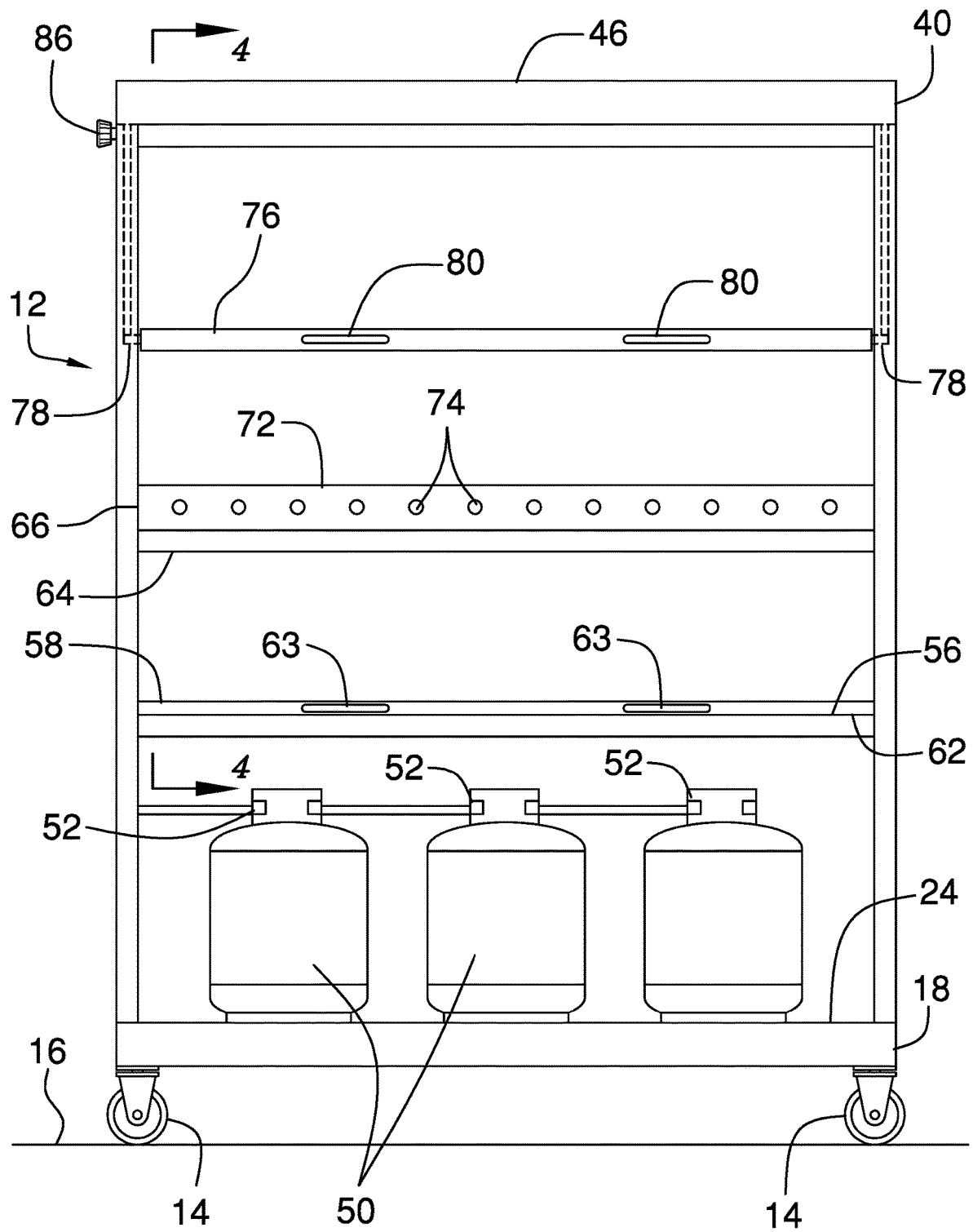
FIG. 2 is a right side phantom view of an embodiment of the disclosure.
Figure 3:
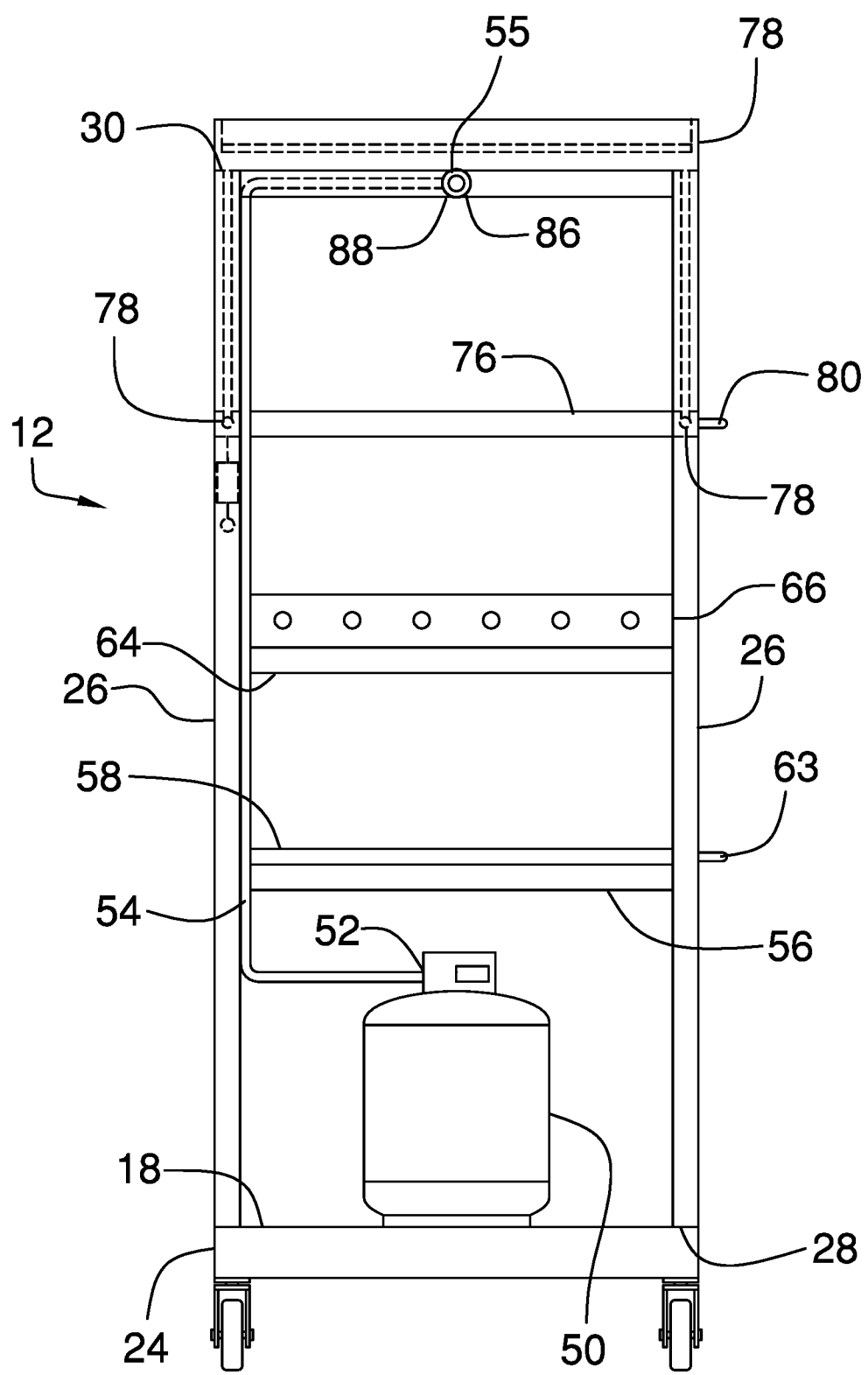
FIG. 3 is a front phantom view of an embodiment of the disclosure.
Figure 4:
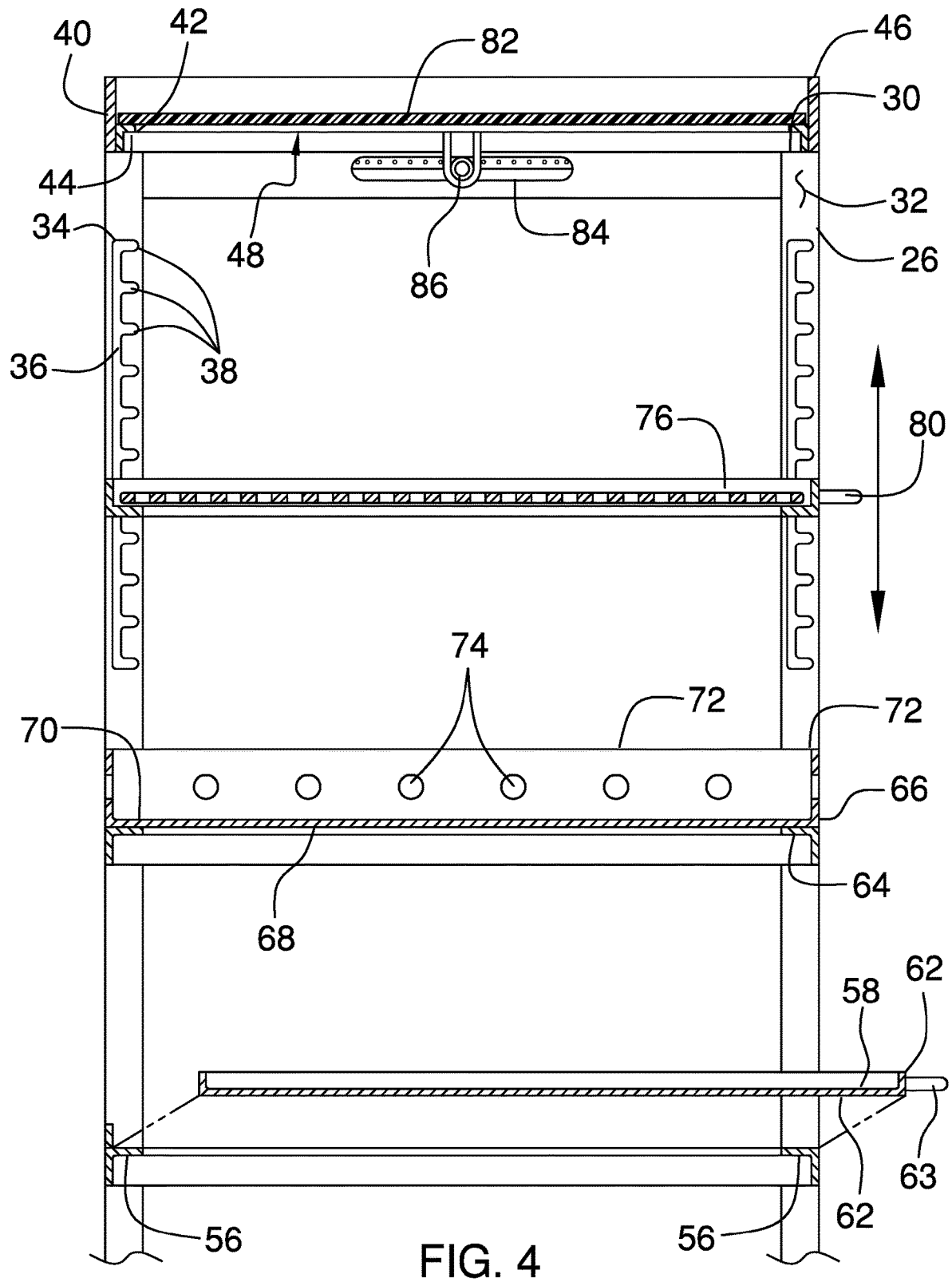
FIG. 4 is a cross sectional view taken along line 4-4 of FIG. 2 of an embodiment of the disclosure.
Figure 5:
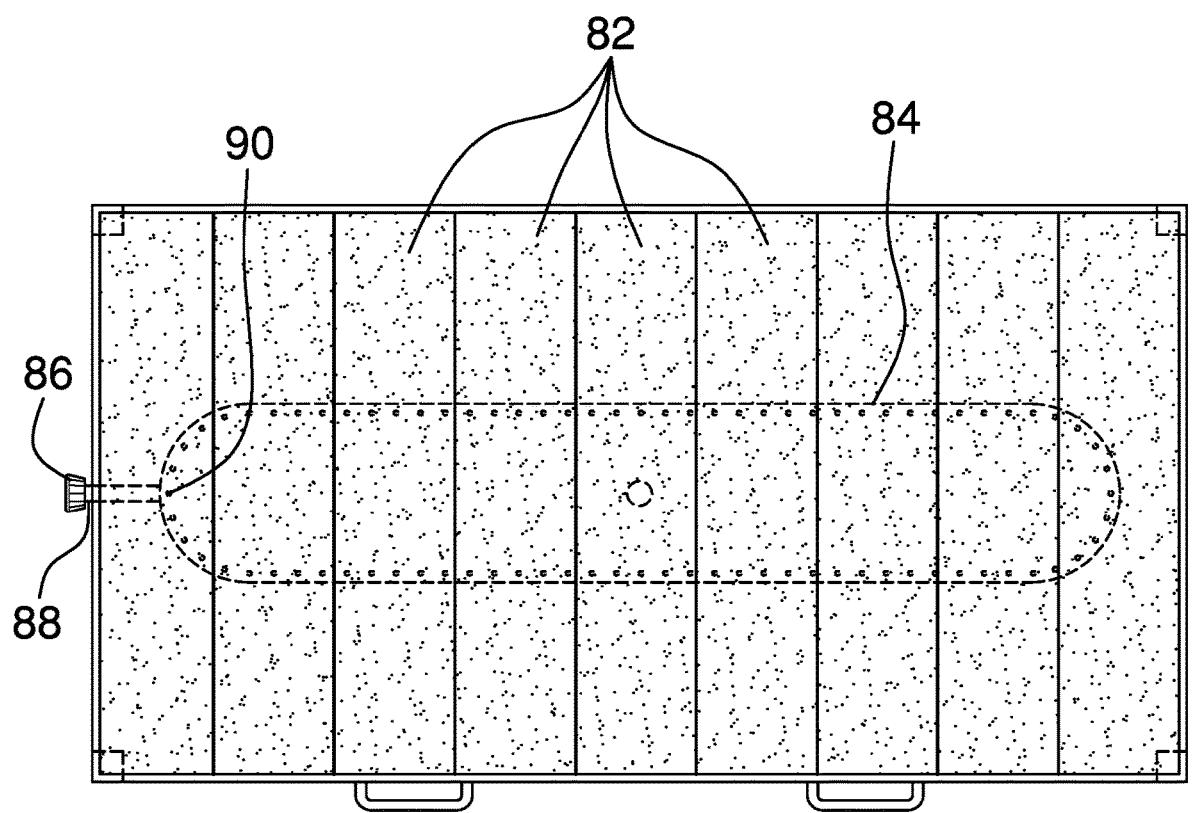
FIG. 5 is a top phantom view of an embodiment of the disclosure.

With reference now to the drawings, and in particular to FIGS. 1 through 5 thereof, a new cooking device embodying the principles and concepts of an embodiment of the disclosure and generally designated by the reference numeral 10 will be described.

As best illustrated in FIGS. 1 through 5, the portable, dual fuel cooking assembly 10 generally comprises a rack 12 that has a plurality of wheels 14 thereon for rolling the rack 12 along a support surface 16, such as a floor or the like. Additionally, the rack 12 is vertically oriented. The rack 12 comprises a bottom pan 18 that has a top surface 20, a bottom surface 22 and a perimeter wall 24 extending upwardly from the top surface 20. Each of the wheels 14 is positioned on the bottom surface 22 of the bottom pan 18. The rack 12 further includes a plurality of uprights 26 that each has a bottom end 28 and a top end 30. The bottom end 28 of each of the uprights 26 is coupled to the top surface 20 of the bottom pan 18 and each of the uprights 26 is aligned with a respective one of four corners of the bottom pan 18.

Each of the uprights 26 is hollow and each of the uprights 26 has a first surface 32. Moreover, each of the uprights 26 is oriented to have the first surface 32 of each of the uprights 26 directed toward an opposite end of the bottom pan 18 with respect to itself. The first surface 32 of each of the uprights 26 has a slot 34 extending into an interior of the uprights 26. The slot 34 on the first surface 32 of each of the uprights 26 has a vertical portion 36 and a plurality of horizontal portions 38 each intersecting and extending laterally way from the vertical portion 36. The slot 34 in the first surface 32 of each of the uprights 26 is positioned closer to the top end 30 than the bottom end 28. Additionally, the horizontal portions 38 of the slot 34 in the first surface 32 of each of the uprights 26 extend the same direction away from the respective vertical portion 36 with respect to each other.

The rack 12 includes a top pan 40 that has an upper surface 42, a lower surface 44 and a perimeter wall 46 extending upwardly from the upper surface 42. The lower surface 44 has the top end 30 of each of the uprights 26 being coupled thereto such that the top pan 40 is spaced from the bottom pan 18. The top pan 40 has an opening 48 extending through the upper 42 and lower 44 surfaces. A plurality of fuel tanks 50 is included and each of the fuel tanks 50 contains a gaseous fuel, such as propane or other gaseous fuel that is available to the public. Additionally, each of the fuel tanks 50 may be 20.0 pound propane tanks or other fuel tank available to the public.

Each of the fuel tanks 50 is positioned on the bottom pan 18 and each of the fuel tanks 50 has an outlet 52. The outlet 52 on the plurality of fuel tanks 50 is daisy chained together such that the plurality of fuel tanks 50 simultaneously supplies gaseous fuel to a supply hose 54. The supply hose 54 has a distal end 55 with respect to the fuel tanks 50 and the supply hose 54 extends upwardly along a respective one of the uprights 26 to the top pan 40. A plurality of first supports 56 and each of the first supports 56 is coupled to and extends between an associated pair of uprights 26. The plurality of first supports 56 is coextensive with the perimeter wall 24 of the bottom pan 18 and each of the first supports 56 is horizontally oriented.

A grease pan 58 is removably positionable on the first supports 56 such that the grease pan 58 is spaced above the bottom pan 18. The grease pan 58 has a bottom surface 60 and an outwardly facing surface 60, and the outwardly facing surface 60 has a first side 62. The bottom surface 22 of the grease pan 58 lies on each of the first supports 56 having the outwardly facing surface 60 being aligned with and being coextensive with the perimeter wall 24 of the bottom pan 18.

A pair of grease handles 63 is each coupled to the grease pan 58 for gripping and thusly positioning the grease pan 58 upon or removing the grease pan 58 from the first supports 56. Each of the grease handles 63 is positioned on and extends away from the first side 62 of the outwardly facing surface 60 of the grease pan 58. A plurality of second supports 64 is each coupled to and extends between an associated pair of the uprights 26. Each of the second supports 64 is spaced upwardly from the first supports 56 such that the plurality of second supports 64 is approximately centrally positioned between the top 30 and bottom 28 ends of the uprights 26. The plurality of second supports 64 is coextensive with the plurality of first supports 56 and each of the second supports 64 is horizontally oriented.

A charcoal pan 66 is removably positionable on the second supports 64 and charcoal 67 can be positioned thereupon. The charcoal pan 66 is comprised of a heat resistant material, such as steel or the like, to facilitate the charcoal 67, or other solid fuel, to be burned thereupon for producing cooking heat. The charcoal pan 66 has a lower side 68, a top side 70 and a lip 72 extending upwardly from the top side 70, and the lip 72 is coextensive with a perimeter of the top side 70. The lip 72 has a plurality of air apertures 74 each extending therethrough for passing air therethrough to support combustion of the charcoal 67. The air apertures 74 are spaced apart from each other and are distributed around an entire perimeter of the lip 72.

A grill 76 is provided and the grill 76 slidably engages the rack 12 having the grill 76 being horizontally oriented and food items can be positioned thereon for cooking. The grill 76 is positionable at a plurality of heights above the charcoal pan 66 to adjust the cooking heat for the food items. A plurality of pins 78 is each coupled to and extends laterally away from the grill 76. Each of the pins 78 is aligned with a respective one of four corners of the grill 76 and each of the pins 78 slidably engages the slot 34 in a respective one of the uprights 26. Each of the pins 78 travels upwardly and downwardly in the vertical portion 36 of the respective slot 34 when the height of the grill 76 is adjusted. Each of the pins 78 slides into a selected one of the horizontal portions 38 of the respective slot 34 for retaining the grill 76 at a selected height from the charcoal pan 66.

A plurality of grill handles 80 is provided and each of the grill handles 80 is coupled to and extends laterally way from the grill 76 for gripping wherein each of the grill handles 80 is configured to assist adjusting the height of the grill 76. A plurality of tiles 82 is each positioned on the top pan 40 for having a food item being positioned thereon for cooking. Each of the tiles 82 extends across the opening 48 in the top pan 40 to close the opening 48. Additionally, each of the tiles 82 is comprised of a thermally conductive material. A burner 84 is coupled to the rack 12 and the burner 84 is positioned beneath the tiles 82 such that the burner 84 directs a flame upwardly onto the tiles 82 when the burner 84 is turned on. In this way the tiles 82 are heated to cook the food item without exposing the food item to combustion. The burner 84 is elongated to extend along an entire length of the opening 48 in the top pan 40. Additionally, the burner 84 may be a gaseous fuel burner 84 of any conventional design.

A valve 86 is coupled to the top pan 40 and the valve 86 has an input 88 and an output 90. The distal end 55 of the supply hose 54 is fluidly coupled to the input 88 of the valve 86 thereby facilitating the valve 86 to receive the gaseous fuel from the fuel tanks 50. The output 90 of the valve 86 is fluidly coupled to the burner 84 and the valve 86 supplies the gaseous fuel to the burner 84 when the valve 86 is turned on. The valve 86 restricts the gaseous fuel from the burner 84 when the valve 86 is turned off and the valve 86 is positioned on the perimeter wall 24 of the top pan 40. The valve 86 may be a burner control valve of any conventional design.

In use, the charcoal 67 can be burned on the charcoal pan 66 for cooking food items on the grill 76 in the conventional of charcoal grilling. Additionally, the burner 84 can be turned on for cooking food items on the plurality of tiles 82 in the convention of frying. In this way food items can be simultaneously cooked in different manners. The grease pan 58 captures grease that drips from the grill 76 during cooking, and the grease pan 58 is removed for emptying when the grease pan 58 is full of grease. Additionally, the grill 76 can be positioned at a selected height over the charcoal pan 66 for adjusting the cooking temperature of the grill 76.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A portable, dual fuel cooking assembly being configured for cooking with either a gaseous fuel or a solid fuel, said assembly comprising:
   a rack having a plurality of wheels thereon for rolling said rack along a support surface having said rack being vertically oriented, said rack comprising
      a bottom pan having a top surface, a bottom surface and a perimeter wall extending upwardly from said top surface, each of said wheels being positioned on said bottom surface,
      a plurality of uprights, each of said uprights having a bottom end and a top end, said bottom end of each of said uprights being coupled to said top surface of said bottom pan, each of said uprights being aligned with a respective one of four corners of said bottom pan, and
      a top pan having an upper surface, a lower surface and a perimeter wall extending upwardly from said upper surface, said lower surface having said top end of each of said uprights being coupled thereto such that said top pan is spaced from said bottom pan, said top pan having an opening extending through said upper and lower surfaces;
   a plurality of fuel tanks, each of said fuel tanks containing a gaseous fuel, each of said fuel tanks being positioned on said rack;
   a plurality of first supports, each of said first supports being coupled to and extending between an associated pair of said uprights;
   a grease pan being removably positionable on said first supports such that said grease pan is spaced above said bottom pan;
   a plurality of second supports, each of said second supports being coupled to and extending between an associated pair of said uprights;
   a charcoal pan being removably positionable on said second supports wherein said charcoal pan is configured to have charcoal positioned thereupon, said charcoal pan being comprised of a heat resistant material wherein said charcoal pan is configured to have the charcoal burned thereupon for producing cooking heat;
   a grill slidably engaging said rack having said grill being horizontally oriented wherein said grill is configured to have food items positioned thereon for cooking, said grill being positionable at a plurality of heights above said charcoal pan wherein said grill is configured to adjust the cooking heat for the food items;
   a plurality of tiles, each of said tiles being positioned on said top pan wherein each of said tiles is configured to have a food item positioned thereon for cooking, each of said tiles being comprised of a thermally conductive material; and
   a burner being coupled to said rack, said burner being positioned beneath said tiles such that said burner directs a flame upwardly onto the tiles when said burner is turned on wherein said tiles are configured to cook the food item;
   each of said fuel tanks being positioned on said top surface of said bottom pan, each of said fuel tanks has an outlet, said outlet on said plurality of fuel tanks being daisy chained together such that said plurality of fuel tanks simultaneously supplies gaseous fuel to a supply hose, said supply hose having a distal end with respect to said fuel tanks, said supply hose extending upwardly along a respective one of said uprights to said top pan;
   said burner being elongated to extend along an entire length of said opening in said top pan; and
   said assembly further comprises a valve being coupled to said top pan, said valve having an input and an output, said input having said distal end of said supply hose being fluidly coupled thereto thereby facilitating said valve to receive the gaseous fuel from said fuel tanks, said output being fluidly coupled to said burner, said valve supplying the gaseous fuel to said burner when said valve is turned on, said valve restricting the gaseous fuel from said burner when said valve is turned off, said valve being positioned on said perimeter wall of said top pan.

2. The assembly according to claim 1, wherein:
   each of said uprights is hollow, each of said uprights having a first surface, each of said uprights being oriented having said first surface of each of said uprights being directed toward an opposite end of said bottom pan with respect to itself;
   said first surface of each of said uprights having a slot extending into an interior of said uprights, said slot on said first surface of each of said uprights having a vertical portion and a plurality of horizontal portions each intersecting and extending laterally away from said vertical portion;
   said slot in said first surface of each of said uprights being positioned closer to said top end than said bottom end; and
   said horizontal portions of said slot in said first surface of each of said uprights extending the same direction away from said respective vertical portion with respect to each other.

3. The assembly according to claim 1, wherein:
   each of said first supports being spaced upwardly from said bottom pan, said plurality of first supports being coextensive with said perimeter wall of said bottom pan, each of said first supports being horizontally oriented; and
   said assembly includes a pair of grease handles, each of said grease handles being coupled to said grease pan for gripping and thusly positioning said grease pan upon or removing said grease pan from said first supports, each of said grease handles being positioned on and extending away from said first side of said outwardly facing surface of said grease pan.

4. The assembly according to claim 3, wherein said grease pan has a bottom surface and an outwardly facing surface, said outwardly facing surface having a first side, said bottom surface of said grease pan lying on each of said first supports having said outwardly facing surface being aligned with and being coextensive with said perimeter wall of said bottom pan.

5. The assembly according to claim 3, wherein:
   each of said second supports is coupled to and extends between an associated pair of said uprights, each of said second supports being spaced upwardly from said first supports such that said plurality of second supports is approximately centrally positioned between said top and bottom ends of said uprights; and
   said plurality of second supports being coextensive with said plurality of first supports, each of said second supports being horizontally oriented.

6. A portable, dual fuel cooking assembly being configured for cooking with either a gaseous fuel or a solid fuel, said assembly comprising:

a rack having a plurality of wheels thereon for rolling said rack along a support surface having said rack being vertically oriented, said rack comprising
  a bottom pan having a top surface, a bottom surface and a perimeter wall extending upwardly from said top surface, each of said wheels being positioned on said bottom surface,
  a plurality of uprights, each of said uprights having a bottom end and a top end, said bottom end of each of said uprights being coupled to said top surface of said bottom pan, each of said uprights being aligned with a respective one of four corners of said bottom pan, and
  a top pan having an upper surface, a lower surface and a perimeter wall extending upwardly from said upper surface, said lower surface having said top end of each of said uprights being coupled thereto such that said top pan is spaced from said bottom pan, said top pan having an opening extending through said upper and lower surfaces;
a plurality of fuel tanks, each of said fuel tanks containing a gaseous fuel, each of said fuel tanks being positioned on said rack;
a plurality of first supports, each of said first supports being coupled to and extending between an associated pair of said uprights;
a grease pan being removably positionable on said first supports such that said grease pan is spaced above said bottom pan;
a plurality of second supports, each of said second supports being coupled to and extending between an associated pair of said uprights;
a charcoal pan being removably positionable on said second supports wherein said charcoal pan is configured to have charcoal positioned thereupon, said charcoal pan being comprised of a heat resistant material wherein said charcoal pan is configured to have the charcoal burned thereupon for producing cooking heat;
a grill slidably engaging said rack having said grill being horizontally oriented wherein said grill is configured to have food items positioned thereon for cooking, said grill being positionable at a plurality of heights above said charcoal pan wherein said grill is configured to adjust the cooking heat for the food items;
a plurality of tiles, each of said tiles being positioned on said top pan wherein each of said tiles is configured to have a food item positioned thereon for cooking, each of said tiles being comprised of a thermally conductive material; and
a burner being coupled to said rack, said burner being positioned beneath said tiles such that said burner directs a flame upwardly onto the tiles when said burner is turned on wherein said tiles are configured to cook the food item;
each of said first supports being spaced upwardly from said bottom pan, said plurality of first supports being coextensive with said perimeter wall of said bottom pan, each of said first supports being horizontally oriented;
said assembly includes a pair of grease handles, each of said grease handles being coupled to said grease pan for gripping and thusly positioning said grease pan upon or removing said grease pan from said first supports, each of said grease handles being positioned on and extending away from said first side of said outwardly facing surface of said grease pan;
each of said second supports is coupled to and extends between an associated pair of said uprights, each of said second supports being spaced upwardly from said first supports such that said plurality of second supports is approximately centrally positioned between said top and bottom ends of said uprights;
said plurality of second supports being coextensive with said plurality of first supports, each of said second supports being horizontally oriented; and
wherein said charcoal pan has a lower side, a top side and a lip extending upwardly from said top side, said lip being coextensive with a perimeter of said top side, said lower side resting on said second supports said lip having a plurality of air aperture each extending therethrough wherein each of said air apertures is configured to have air pass therethrough for supporting combustion of the charcoal, said air apertures being spaced apart from each other and being distributed around an entire perimeter of said lip.

7. The assembly according to claim 2, further comprising:
a plurality of pins, each of said pins being coupled to and extending laterally away from said grill, each of said pins being aligned with a respective one of four corners of said grill, each of said pins slidably engaging said slot in a respective one of said uprights, each of said pins travelling upwardly and downwardly in said vertical portion of said respective slot when the height of said grill is adjusted, each of said pins sliding into a selected one of said horizontal portions of said respective slot for retaining said grill at a selected height from said charcoal pan; and
a plurality of grill handles, each of said grill handles being coupled to and extending laterally way from said grill for gripping wherein each of said grill handles is configured to assist adjusting the height of said grill.

8. A portable, dual fuel cooking assembly being configured for cooking with either a gaseous fuel or a solid fuel, said assembly comprising:
  a rack having a plurality of wheels thereon for rolling said rack along a support surface having said rack being vertically oriented, said rack comprising:
    a bottom pan having a top surface, a bottom surface and a perimeter wall extending upwardly from said top surface, each of said wheels being positioned on said bottom surface;
    a plurality of uprights, each of said uprights having a bottom end and a top end, said bottom end of each of said uprights being coupled to said top surface of said bottom pan, each of said uprights being aligned with a respective one of four corners of said bottom pan, each of said uprights being hollow, each of said uprights having a first surface, each of said uprights being oriented having said first surface of each of said uprights being directed toward an opposite end of said bottom pan with respect to itself, said first surface of each of said uprights having a slot extending into an interior of said uprights, said slot on said first surface of each of said uprights having a vertical portion and a plurality of horizontal portions each intersecting and extending laterally way from said vertical portion, said slot in said first surface of each of said uprights being positioned closer to said top end than said bottom end, said horizontal portions of said slot in said first surface of each of said uprights extending the same direction away from said respective vertical portion with respect to each other; and a top pan having an upper surface, a lower surface and a perimeter wall extending upwardly from said upper surface, said lower surface having said top end of each of said uprights being coupled thereto such that said top pan is spaced from said bottom pan, said top pan having an opening extending through said upper and lower surfaces;

a plurality of fuel tanks, each of said fuel tanks containing a gaseous fuel, each of said fuel tanks being positioned on said bottom pan, each of said fuel tanks having an outlet, said outlet on said plurality of fuel tanks being daisy chained together such that said plurality of fuel tanks simultaneously supplies gaseous fuel to a supply hose, said supply hose having a distal end with respect to said fuel tanks, said supply hose extending upwardly along a respective one of said uprights to said top pan;

a plurality of first supports, each of said first supports being coupled to and extending between an associated pair of said uprights, each of said first supports being spaced upwardly from said bottom pan, said plurality of first supports being coextensive with said perimeter wall of said bottom pan, each of said first supports being horizontally oriented;

a grease pan being removably positionable on said first supports such that said grease pan is spaced above said bottom pan, said grease pan having a bottom surface and an outwardly facing surface, said outwardly facing surface having a first side, said bottom surface of said grease pan lying on each of said first supports having said outwardly facing surface being aligned with and being coextensive with said perimeter wall of said bottom pan;

a pair of grease handles, each of said grease handles being coupled to said grease pan for gripping and thusly positioning said grease pan upon or removing said grease pan from said first supports, each of said grease handles being positioned on and extending away from said first side of said outwardly facing surface of said grease pan;

a plurality of second supports, each of said second supports being coupled to and extending between an associated pair of said uprights, each of said second supports being spaced upwardly from said first supports such that said plurality of second supports is approximately centrally positioned between said top and bottom ends of said uprights, said plurality of second supports being coextensive with said plurality of first supports, each of said second supports being horizontally oriented;

a charcoal pan being removably positionable on said second supports wherein said charcoal pan is configured to have charcoal positioned thereupon, said charcoal pan being comprised of a heat resistant material wherein said charcoal pan is configured to have the charcoal burned thereupon for producing cooking heat, said charcoal pan having a lower side, a top side and a lip extending upwardly from said top side, said lip being coextensive with a perimeter of said top side, said lip having a plurality of air aperture each extending therethrough wherein each of said air apertures is configured to have air pass therethrough for supporting combustion of the charcoal, said air apertures being spaced apart from each other and being distributed around an entire perimeter of said lip;

a grill slidably engaging said rack having said grill being horizontally oriented wherein said grill is configured to have food items positioned thereon for cooking, said grill being positionable at a plurality of heights above said charcoal pan wherein said grill is configured to adjust the cooking heat for the food items;

a plurality of pins, each of said pins being coupled to and extending laterally away from said grill, each of said pins being aligned with a respective one of four corners of said grill, each of said pins slidably engaging said slot in a respective one of said uprights, each of said pins travelling upwardly and downwardly in said vertical portion of said respective slot when the height of said grill is adjusted, each of said pins sliding into a selected one of said horizontal portions of said respective slot for retaining said grill at a selected height from said charcoal pan;

a plurality of grill handles, each of said grill handles being coupled to and extending laterally way from said grill for gripping wherein each of said grill handles is configured to assist adjusting the height of said grill;

a plurality of tiles, each of said tiles being positioned on said top pan wherein each of said tiles is configured to have a food item positioned thereon for cooking, each of said tiles extending across said opening in said top pan to close said opening, each of said tiles being comprised of a thermally conductive material;

a burner being coupled to said rack, said burner being positioned beneath said tiles such that said burner directs a flame upwardly onto the tiles when said burner is turned on wherein said tiles are configured to cook the food item, said burner being elongated to extend along an entire length of said opening in said top pan; and a valve being coupled to said top pan, said valve having an input and an output, said input having said distal end of said supply hose being fluidly coupled thereto thereby facilitating said valve to receive the gaseous fuel from said fuel tanks, said output being fluidly coupled to said burner, said valve supplying the gaseous fuel to said burner when said valve is turned on, said valve restricting the gaseous fuel from said burner when said valve is turned off, said valve being positioned on said perimeter wall of said top pan.

* * * * *